United States Patent [19]

Dernedde et al.

[11] 4,433,825
[45] Feb. 28, 1984

[54] STRESS-RESISTANT MOUNT FOR THE CASING OF A CENTRIFUGAL PUMP

[75] Inventors: Robert Dernedde; Jürgen Koch, both of Frankenthal, Fed. Rep. of Germany

[73] Assignee: Klein, Schanzlin & Becker Aktiengesellschaft, Frankenthal, Fed. Rep. of Germany

[21] Appl. No.: 228,965

[22] Filed: Jan. 27, 1981

[30] Foreign Application Priority Data

Feb. 12, 1980 [DE] Fed. Rep. of Germany ....... 3005093

[51] Int. Cl.³ .............................................. F16M 1/00
[52] U.S. Cl. .................................. 248/672; 248/675; 248/676
[58] Field of Search .................... 298/637, 671–678

[56] References Cited

U.S. PATENT DOCUMENTS

| 596,280 | 12/1897 | Short | 248/637 |
| 1,366,538 | 1/1921 | Masters | 248/637 |
| 1,517,101 | 11/1924 | Borger | 248/671 |
| 1,879,458 | 9/1932 | Peltier | 248/671 |
| 2,537,501 | 1/1951 | Woodward | 248/676 |
| 2,661,172 | 12/1953 | Needham | 248/671 |
| 2,684,825 | 7/1954 | Laviana et al. | 248/671 |
| 3,221,400 | 12/1965 | Halsey | 248/676 |
| 4,207,484 | 6/1980 | Krecker | 248/674 |

FOREIGN PATENT DOCUMENTS 686467 7/1940 Fed. Rep. of Germany ...... 248/671

Primary Examiner—Alexander Grosz
Assistant Examiner—Michael F. Trettel
Attorney, Agent, or Firm—Kontler, Grimes & Battersby

[57] ABSTRACT

The casing of a centrifugal pump which is subjected to pronounced external stresses is secured to a foundation or to a base plate by one or more rings which surround the casing and receive stresses therefrom. Each ring has lugs which transmit the stresses to the support; one surface of each such lug can be located in a plane which includes the axis of the pump casing and each of these surfaces abuts a complementary surface of the support. If the casing is surrounded by two rings, each ring is located at a different axial end of the casing. One of the rings can be shrunk onto the casing, and the other ring then allows the casing to move angularly and/or axially therein or therewith but relative to the foundation or base plate so as to compensate for dimensional changes in response to temperature changes. Instead of being shrunk onto the casing, the one ring can be secured thereto by one or more keys, wedges and/or pins.

18 Claims, 2 Drawing Figures

STRESS-RESISTANT MOUNT FOR THE CASING OF A CENTRIFUGAL PUMP

BACKGROUND OF THE INVENTION

The present invention relates to centrifugal pumps in general, and more particularly to improvements in means for mounting the casings of centrifugal pumps in or on foundations, base plates or analogous supports. Still more particularly, the invention relates to improvements in means for securing to a foundation or a like support a centrifugal pump whose casing is subjected to pronounced or very pronounced external stresses.

High-output centrifugal pumps are often subject to substantial external stresses which must be transmitted to the supports for the pump casings. A typical example of externally stressed centrifugal pumps is the feed pump in a nuclear power station. Such pump has a capacity in excess of 4000 m$^3$/h, a total head of approximately 600 m and a speed in the range of 5000 RPM. The feed pumps in fossil fuel power stations, too, are subjected to very pronounced external stresses. These pronounced stresses can interfere with proper operation of the pumps and/or pump motors. Therefore, and since the pump normally constitutes (or is supposed to constitute) a fixed component of a pipe line, it is very important to adequately anchor the pump casing in or on a support, such as a foundation or a base plate.

In many presently known pump-motor aggregates, the pump casing is secured to a foundation or to another support through the medium of specially designed projections which are integral parts of the casing (the casing is normally a casting) and are affixed to the support. As the magnitude of anticipated stresses increases, the dimensions of such extensions also increase which, in turn, increases the likelihood of defects in the respective portions of the casing. Attempts to replace extensions which are integral parts of the casing of a centrifugal pump with projections which are welded to the casing have met with little or no success. The main reason for such failure of welded projections or extensions is that welding involves heating of selected portions of the casing with attendant danger of deformation. Therefore, a welded-on extension must be tested by resorting to costly equipment and with additional loss in time. Furthermore, the welding itself is a costly and time-consuming operation.

OBJECTS AND SUMMARY OF THE INVENTION

An object of the invention is to provide a novel and improved stress-resistant mount for the casing of a centrifugal pump, especially a centrifugal pump whose casing is subjected to pronounced or very pronounced external stresses.

Another object of the invention is to provide a novel and improved connection between the casing of a centrifugal pump and a foundation, a base plate or an analogous support.

A further object of the invention is to provide a connection which is designed in such a way that it does not contribute to the bulk of the casing and that it allows for the making of the casing in relatively simple apparatus.

An additional object of the invention is to provide a novel and improved system for securing a cylindrical or substantially cylindrical casing to a support in such a way that external stresses which are applied to the casing can be safely transmitted to the support and also that the casing can expand or contract in response to temperature changes.

Still another object of the invention is to provide novel and improved means for indirectly coupling a centrifugal pump casing to the foundation in such a way that the casing need not be provided with integral or welded-on projections in the form of lugs, flanges or the like.

A further object of the invention is to provide a connection of the above outlined character which allows the motor to remain in accurate alignment with the pump even if the casing of the pump is subjected to very pronounced stresses and even if the casing of the pump undergoes appreciable expansion or contraction as a result of temperature changes.

The invention resides in the provision of means for securing the externally stressed casing of a centrifugal pump to a support, e.g., to a foundation or to a base plate. The securing means comprises at least one annular member (e.g., a one-piece ring or a composite ring which consists of several interconnected sections) which surrounds the casing and serves to take up stresses acting on the casing (e.g., stresses in the order of magnitude encountered by the casings of centrifugal pumps which are used in nuclear reactor plants), and means (e.g., one or more outwardly extending lugs or analogous extensions of the annular member) for transmitting such stresses to the support.

The casing is or may be a cylindrical body; in such instances, the securing means may comprise two annular members each of which surrounds a different end portion of the cylindrical casing. The extension or extensions of each annular member are preferably provided with surfaces which are located in a plane including the axis of the casing (i.e., the axis of the pump shaft) and abut against complementary surfaces of the support.

If the securing means comprises several annular members, one of the annular members may be rigid with the casing (e.g., the one annular member may be shrunk onto an end portion of the casing) and another annular member may movably surround the casing so that the latter can move radially and/or axially of the other annular member.

The securing means preferably further comprises means for holding the annular member or members against angular movement relative to the casing and/or vice versa. Such holding means may include one or more keys interposed between an annular member and the casing and extending in parallelism with the axis of the casing and/or one or more pins disposed substantially radially of the annular member and having first and second portions which respectively extend into the annular member and into the casing.

If desired, an annular member can be secured to a cover of the casing by one or more fasteners. Alternatively or in addition to such solution, the casing can have one or more extensions and the securing means then further comprises fastener means for attaching an annular member to the extension or extensions.

The novel features which are considered as characteristic of the invention are set forth in particular in the appended claims. The improved securing means itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
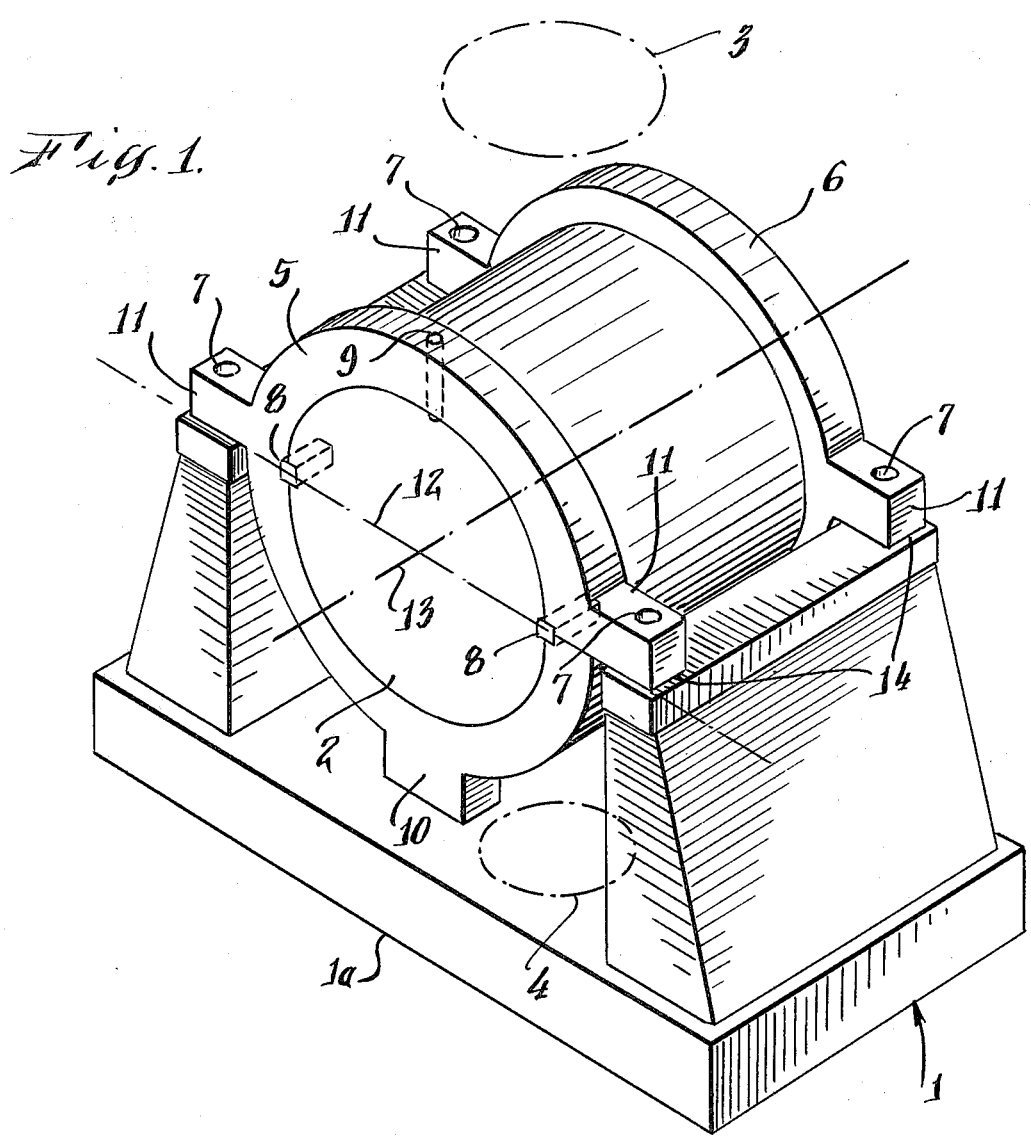
FIG. 1 is a perspective view of a centrifugal pump casing, of a foundation for the casing, and of one form of the stress-resistant mount which secures the casing to the foundation.

Referring to FIG. 1, there is shown a support 1 which is a pump foundation and carries the schematically illustrated substantially cylindrical casing 2 of a centrifugal pump, e.g., a centrifugal pump of the type used as a feed or reactor pump in a nuclear reactor plant. In such plants, the casing of a centrifugal pump is subjected to pronounced external stresses which must be transmitted to the support. To this end, the structure of FIG. 1 further comprises means for securing the casing 2 to the support 1, and such securing means includes two annular members 5 and 6 (hereinafter called rings for short) which respectively surround the front and rear end portions of the generally cylindrical casing. The phantom-line circle 3 denotes a suction or intake nozzle which admits fluid into the interior of the casing. The phantom-like circle 4 denotes one possible location of the outlet or discharge nozzle. It will be noted that, in the embodiment of FIG. 1, the suction nozzle 3 is located at a level above the main portion of the casing 2, i.e., it extends upwardly and a way from the main portion of the casing, and the nozzle 4 extends downwardly and away from the main portion of the casing substantially in line with the nozzle 3.

The ring 5 of the securing means serves as a fixed connector for the casing 2, i.e., it is fixedly secured to the casing as well as to the support 1. On the other hand, the ring 6 allows the casing 2 to turn therein as well as to move axially. Each of these rings has two extensions or lugs 11 which are located diametrically opposite each other with reference to the axis 13 of the casing 2 and, together with screws, bolts or analogous fasteners 7, constitute the means for transmitting stresses from the rings to the support 1.

The undersides or bottom surfaces 14 of the lugs 11 are located in the plane 12 of the axis 13. This ensures that the pump cannot be shifted relative to the motor (not shown) which drives the pump shaft regardless of changes in temperature of the casing 2, rings 5, 6 and/or support 1.

The ring 5 is affixed to the respective end portion of the casing 2 by one or more holding means in the form of axially parallel keys 8 which are fitted into complementary grooves of the ring 5 and casing 2. The keys 8 hold the casing against angular movement relative to the ring 5 and/or vice versa. In addition, the connection between the ring 5 and the casing 2 includes a radially disposed holding pin 9 portions of which extend into the ring 5 as well as into the casing 2 to hold the casing against axial and/or angular movement relative to the ring 5.

An external extension or projection 10 of the ring 5 can constitute an additional component of the means for transmitting stresses from the casing 2 to the support 1. The bottom end face of this extension can abut against the upper side of the adjacent portion (base plate) 1a of the support 1.

It is equally within the purview of the invention to simply shrink the ring 5 onto the respective end portion of the casing 2 and to omit the elements 8 and 9. Still further, it is also possible to rigidly connect the rings 5, 6 with the casing 2 and to movably install the ring 5 and/or 6 in the support 1 so as to compensate for expansion or contraction of the casing in response to temperature changes. Thus, each of the rings 5, 6 or at least one of these rings can be turnably or axially movably mounted in the support 1 as long as it is capable of transmitting stresses from the casing 2 to the support.

Figure 2:
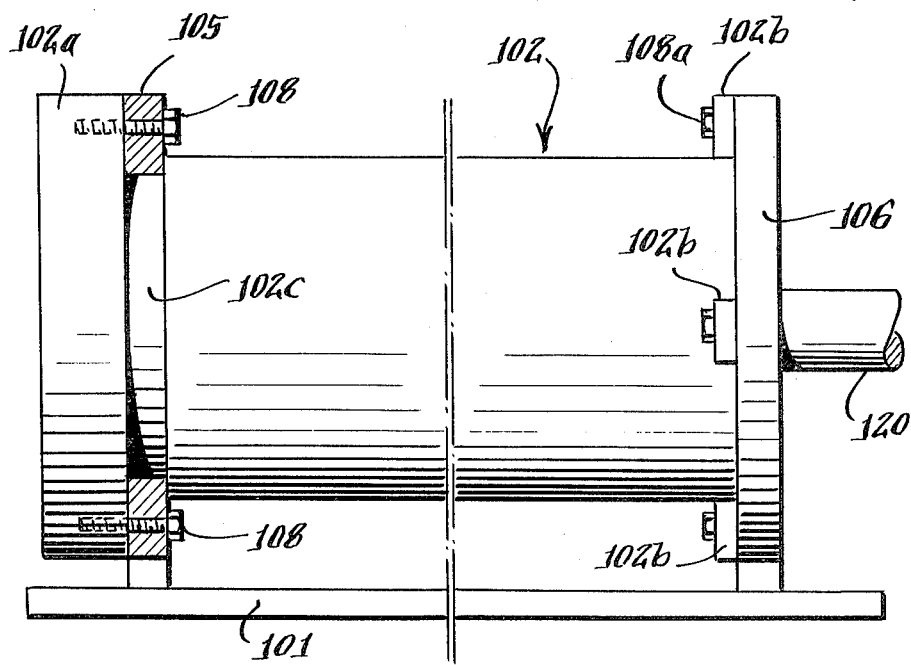
FIG. 2 is a schematic partly side elevational and partly sectional view of a modified mount.

FIG. 2 shows a casing 102 which has a cover 102a secured to the adjacent ring 105 by screws, bolts or analogous fasteners 108. The other end portion of the casing 102 has a plurality of extensions 102b which are secured to the adjacent ring 106 by screws, bolts or analogous fasteners 108a. The manner in which the rings 105, 106 transmit stresses to the support which includes a base plate 101 is or can be the same as described in connection with FIG. 1.

An important advantage of the improved securing means is that the casing need not be provided with large and/or numerous integral extensions such as would necessitate special testing for the presence of defects, either as a result of casting or as a result of temperature changes or temperature-induced stresses which arise during welding of extensions to the main portion of the casing. Furthermore, the casing can be manufactured (cast) in a relatively simple mold because the mold need not be designed to provide the casing with protuberances in the form of lugs or the like.

The rings 5, 6, 105 and/or 106 may consist of two or more sections which are separably connected to each other. For example, the ring 105 of FIG. 2 may consist of two semicircular halves. The selection of one-piece or composite rings depends on a number of factors, such as convenience of manufacture, dimensions of the casing and/or others.

An advantage of the feature that the rings 5, 6 or 105, 106 are located at or close to the respective axial ends of the casing 2 or 102 is that the transmission of stresses from the casing to the support takes place via relatively long lever arms.

It has been found that the establishment of a rigid connection between one of the rings and the casing does not interfere with heat-induced expansion or contraction of the casing and/or with adequate alignment of the pump shaft 120 (FIG. 2) with the motor which drives the pump, as long as one of the two rings has a certain freedom of movement relative to the support. The aforementioned selection of positions of the surfaces 14 shown in FIG. 1 (namely, in the plane 12 of the pump axis 13) also contributes to convenience of compensation for temperature-induced deformation of the casing. The ability of the pump casing to "grow", as considered in the radial direction thereof, in response to rising temperature of conveyed fluid is important because this ensures adequate alignment of the casing with the pump motor. The ability of the casing to move axially relative to one of the rings ensures that the casing can undergo thermally induced deformation without affecting its connection with the support.

The tongues 8 and/or pin 9 of FIG. 1 can be replaced with other suitable means for holding the casing against movement relative to one of the rings. For example, it is possible to employ wedges, wedges and pins, wedges and keys, several pins without wedges and/or keys, and so forth. The selection will depend on the availability of space, e.g., on the location of nozzles 3 and 4. Other modes of securing at least one ring to the casing 2 or 102 include the aforementioned shrinking as well as conical seats and/or others. For example, a ring which is shrunk onto the casing can constitute a fixed bearing whereas a second ring can rotatably and axially movably surround the casing, preferably at a certain distance from the fixed bearing. Also, the second ring can be slidably mounted in the support. This, too, compensates for temperature-induced changes in dimensions of the casing as well as for those changes in dimensions which are brought about by forces acting upon the casing when the pump is in use.

It is further possible to modify the structure which is shown in FIG. 2 by providing the end portions of the casing 102 with external flanges for connection of covers thereto. The rings 105, 106 are then inwardly adjacent to the flanges or each such ring can be installed between a flange and the corresponding cover. With reference to FIG. 2, the left-hand ring 105 can be disposed between the illustrated cover 102a and a flange (not shown) which is an integral part of the casing 102 and is adjacent to the right-hand end face of the ring 105. Still further, the ring 5, 6, 105 or 106 can be recessed into the peripheral surface of the casing. This is shown in FIG. 2 where the ring 105 extends into a circumferential recess 102c of the casing 102. The above modifications are advantageous on the ground that they allow for a dismantling of the centrifugal pump (namely, for removal of parts which are installed in the interior of the casing) without detaching the casing from its support.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. The combination of a support; an externally stressed pump casing; and means for securing said casing to said support, comprising at least one annular member surrounding and carrying said casing to thereby take up stresses acting on said casing, and means for transmitting such stresses from said annular member to said support.

2. The combination of claim 1, wherein said support includes a pump foundation.

3. The combination of claim 1, wherein said support includes a base plate.

4. The combination of claim 1, wherein said casing has first and second end portions and said annular member surrounds one of said end portions.

5. The combination of claim 4, wherein said securing means further comprises a second annular member surrounding the other end portion of said casing.

6. The combination of claim 16, wherein said annular member is a composite ring having several interconnected sections.

7. The combination of claim 16, wherein said annular member is a one-piece ring.

8. The combination of claim 1, wherein said securing means comprises a plurality of annular members each of which surrounds said casing, said annular members including a first annular member rigid with said casing and a second annular member movably surrounding said casing.

9. The combination of claim 1, further comprising means for holding said casing against angular displacement in said annular member.

10. The combination of claim 9, wherein said holding means includes a tongue interposed between said casing and said annular member.

11. The combination of claim 9, wherein said holding means comprises at least one pin disposed substantially radially of said annular member and having first and second portions respectively extending into said casing and said annular member.

12. The combination of claim 1, said support including a base which is located below and is spaced from said annular member; and wherein said means for transmitting stresses comprises an extension which projects downward from said annular member and has a lower end face in abutment with said base.

13. The combination of claim 1, wherein said casing is a centrifugal pump casing.

14. The combination of a support; an externally stressed pump casing having an axis located in a predetermined plane; and means for securing said casing to said support, comprising at least one annular member surrounding and carrying said casing to thereby take up stresses acting on said casing, and means for transmitting such stresses from said annular member to said support, said means for transmitting stresses including extensions provided on said annular member and having surfaces located in said plane and abutting against said support.

15. The combination of claim 14, wherein said casing is substantially cylindrical.

16. The combination of claim 14, wherein said predetermined plane is substantially horizontal.

17. The combination of a support; an externally stressed centrifugal pump casing having a cover; and means for securing said casing to said support, comprising at least one annular member surrounding said casing and arranged to take up stresses acting on said casing, means for transmitting such stresses from said annular member to said support, and means for fastening said annular member to said cover.

18. The combination of a support; an externally stressed pump casing having at least one extension; and means for securing said casing to said support, comprising at least one annular member surrounding and carrying said casing to thereby take up stresses acting on said casing, means for transmitting such stresses from said annular member to said support, and means for fastening said annular member to said extension.

* * * * *